May 9, 1961  C. L. SHANO  2,983,844
CONTROL SYSTEM
Filed April 24, 1958
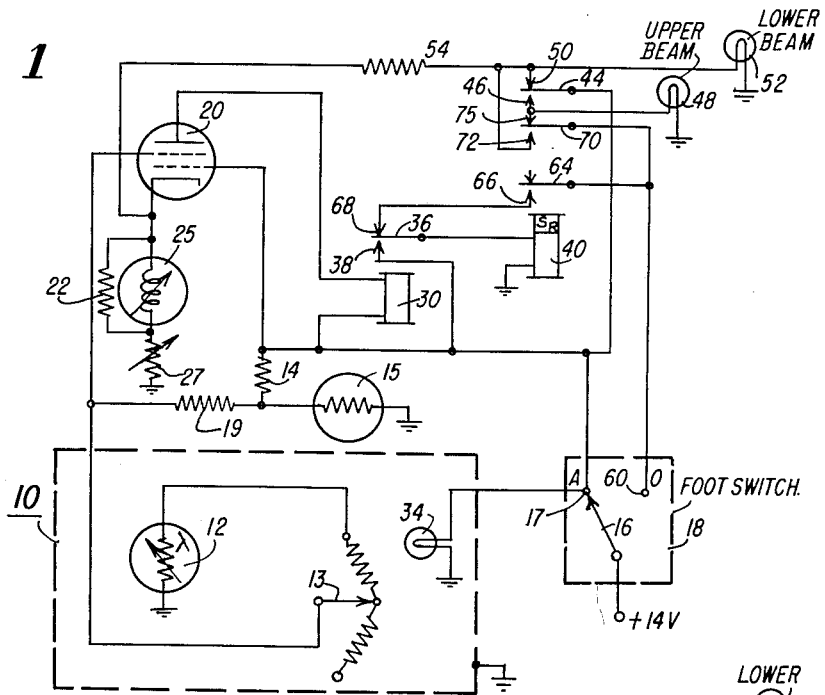
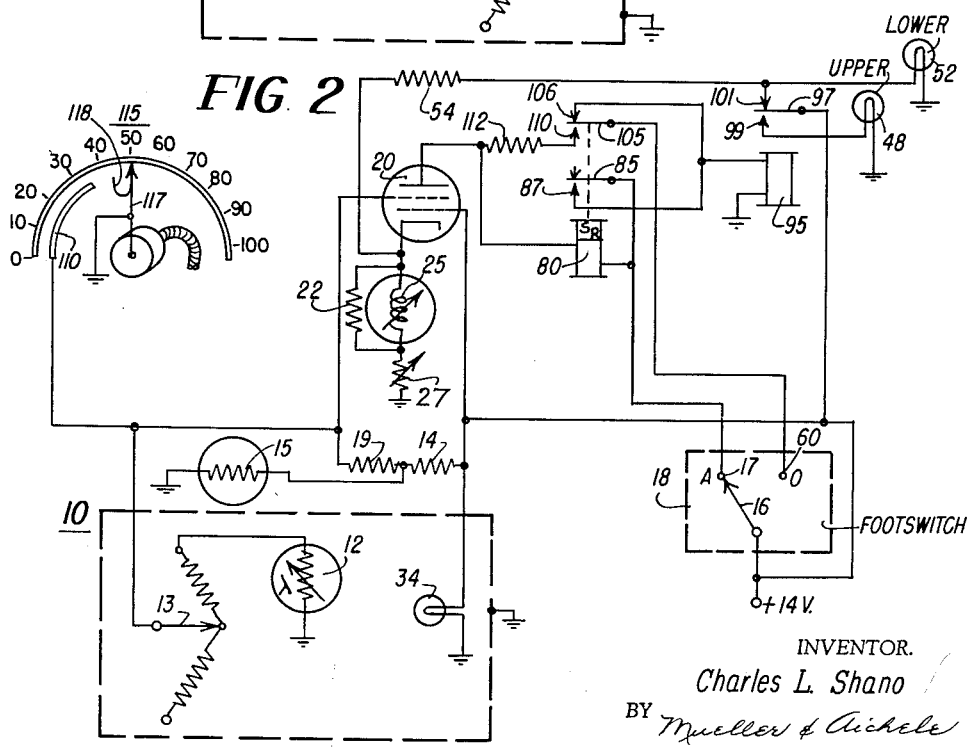
INVENTOR.
Charles L. Shano
BY Mueller & Aichele
Attys.

United States Patent Office 2,983,844
Patented May 9, 1961

2,983,844

CONTROL SYSTEM

Charles L. Shano, Chicago, Ill., assignor to Motorola,
Inc., Chicago, Ill., a corporation of Illinois Filed April 24, 1958, Ser. No. 730,648

7 Claims. (Cl. 315—83)

This invention relates to control systems and more particularly to an automatic headlamp control system for the upper and lower beam filaments, such as used in automobiles.

There are various known circuits for use in automobiles or other vehicles to automatically dim headlamps in response to the light from headlamps of an oncoming vehicle. These prior systems have not gone into general use due to the complexity of the circuitry which results in high cost of the apparatus and reduced reliability. Furthermore, while a manual override switch for the automatic control system has been recognized as necessary in the prior art, many of these dimmer systems have not provided a desirable override control under all conditions of the circuit, particularly in systems which did not require numerous comparatively expensive components. This lack of inexpensive override control has additionally made the prior systems less acceptable for mass production and general use in automobiles.

An object of the present invention is to provide an automatic headlamp control system requiring a minimum number of relatively low cost components for automatically responding to the oncoming lights of another vehicle for automatic dimming purposes and for affording complete manual override control of the automatic system when that is desirable.

Another object is to provide such a control system wherein all of the circuit components operate directly from the electrical power system of a vehicle, furnished, for example, by the 14-volt (nominal) battery and generator in an automobile.

Another object is to provide an improved automatic headlamp dimmer control having a compensated circuit for positive and stabilized response to oncoming lights of another vehicle and for more reliable operation from an auto electrical power system, the output voltage from which may vary considerably under different vehicle operating conditions.

A still further object is to provide a headlamp control system with an improved and simplified circuit for automatically locking the system on the lower beam filament at low vehicle speeds to avoid undesirable switching to the upper beam filament when it is not ordinarily needed.

A feature of the invention is the provision of an improved dimmer control system with a photosensitive device and an amplifier stage with a single vacuum tube having a space charge grid, and voltage regulating devices in the energization circuits for these components so that the system may be operated directly from the vehicular electrical system and so that its operation will be stabilized despite voltage changes in the electrical power system.

Another feature is the provision of a headlamp dimmer control system utilizing two single winding relays, one for controlling the upper and lower beam filaments and the other to operate the filament control relay according to the conduction of an associated light sensitive control circuit, with one of the relays having contacts established in either condition thereof and coupled to an overriding switch for completing circuits to override the control system and change the energized one of the beam filaments.

A further feature is the provision of an improved and simplified dimmer control system with an electron discharge device controlled by a light sensitive device to operate beam control relays and a bias system for the discharge device to establish the necessary change in the illumination level for automatically switching beam filaments and wherein the bias system includes a resistor connected to one beam filament which provides a different energization voltage for the bias system depending upon whether that beam filament is energized or deenergized.

A still further feature is the provision of vehicle speed sensing means connected to the input of an amplifier circuit in an automatic headlamp control system to establish the circuit in a condition which maintains the lower beam filament energized when the vehicle speed is below a given level.

Further objects, features and the attending advantages of the invention will be apparent upon consideration of the following description when taken in conjunction with the accompanying drawings in which:

Fig. 1 is a schematic diagram of a headlamp control system constructed in accordance with the invention; and Fig. 2. is a schematic diagram of a modified form of the circuit of Fig. 1.

Briefly, a specific form of the invention includes a photosensitive device coupled to control the conduction of a vacuum tube which has a control relay connected in the anode circuit thereof. The photosensitive device is energized by a voltage regulated circuit adapted to be coupled to an auto electrical system. The vacuum tube is also directly coupled to the electrical system and a voltage regulating device is included in its cathode circuit. The tube includes a space charge grid and associated circuit for improved operation directly from the relatively low voltage of the auto electrical power system. Light from an oncoming vehicle falling on the photosensitive device causes reduced conduction of the vacuum tube and release of the control relay and deenergization of a beam filament control relay to establish a circuit for the lower beam filament. The lower beam filament is also coupled to a resistor in the cathode bias circuit for the tube to increase the bias when the lower beam filament is energized, thereby tending to maintain this filament energized despite a small reduction in the illumination level on the photosensitive device. When the upper beam filament is energized, a circuit for the bias resistor is completed through the lower beam filament to lower the bias on the tube and increase the sensitivity of response to the photosensitive device.

A two-position foot switch is operable to remove the energizing voltage from the control relay in the lower beam condition of the system and to apply through closed contacts of one of the relays a voltage to establish the upper beam filament circuit for overriding of the automatic system. When the automatic operation of the system establishes the upper beam filament, one of the relays, which is of the slow-to-release type, has extra contacts for a self-holding circuit and the foot switch is used to energize a circuit therethrough and open the upper beam filament circuit and establish a lower beam filament circuit.

In the circuit of Fig. 1, an assembly 10 is designed to be mounted in a position convenient to an operator of a vehicle in which the control system is used and in a position where light from the headlamps of an oncoming vehicle will strike the photosensitive device 12. This photodevice is connected between ground and variable resistor 13 which is coupled to the second (signal)

grid of vacuum tube 20. Resistor 13 is of the "step" type and provides a sensitivity control for the user of the device. Resistor 14 is series connected with varistor 15 between the terminal 17 of footswitch 18 and ground. The arm 16 of the switch 18 is connected to the electrical power system of the vehicle in which the device is used. This power system may supply a potential of the order of 11–17 volts with respect to ground. Usually a 12 volt battery and generator are used for power in present day autos and the supply potential is approximately 14 volts when the vehicle motor is operating the generator.

With contacts 16, 17 of the switch 18 closed, the system will control the headlamps automatically. Varistor 15 has a negative resistance-current characteristic so that the potential thereacross decreases as the vehicle supply voltage rises (and increases as the voltage decreases), thereby providing a regulated voltage at the junction of resistor 14 and varistor 15. This junction is connected through resistor 19 to the second grid of tube 20 so that as the resistance of device 12 changes due to the application of light thereto, a variable signal voltage is applied to tube 20. The voltage regulated circuit 14, 15 renders the system relatively insensitive to voltage changes in the auto electrical system.

The cathode of tube 20 is connected through the variable regulator resistor 25 and the sensitivity control 27 to ground. Resistor 22 is connected across resistor 25. Resistor 25 has a positive characteristic, such that the resistance thereof increases as the current through it increases, thus tending to raise the bias on tube 20 and lower the energizing potentials for the other elements of this tube when the supply voltage for the system rises, as may happen in an automobile electrical system when the generator is driven at a higher speed. Similarly the bias is reduced when the supply voltage decreases. Cathode bias resistor 27 may be used to set the overall sensitivity and resistor 13 may be of the type variable in steps for changes in sensitivity which a user of the device may wish to make.

The first grid of tube 20 is connected to contact 17 to be energized by the positive potential and this is known as a space charge grid. This energization of the first grid causes the formation of a virtual cathode in the region of the second (signal) grid and assists in maintaining substantial plate current despite the comparatively low energizing voltage of approximately 14 volts.

The anode of tube 20 is connected in series with the winding of relay 30 and to contact 17 for energization by B+. The pilot light 34 is also connected to contact 17 and this indicates that the footswitch 18 is in the automatic position. Obviously the remainder of the circuit beyond assembly 10 may be constructed in compact form and positioned in any convenient place in the vehicle.

Assuming that the system is operating in a comparatively dark area where there are no oncoming headlamps to cause automatic headlamp dimming, tube 20 will be conducting to energize relay 30. Relay arm 36 will therefore pull in to engage contact 38 which is connected to contact 17 to complete a circuit to the positive potential supply for the winding of relay 40. Relay 40 is therefore energized which pulls in the relay arm 44 to engage contact 46. Relay arm 44 is connected to contact 17 and contact 46 is connected to the upper beam filament 48 in the vehicle so that this filament (and there may be more than one) is then energized by the automatic control system.

When sufficient illumination strikes the photosensitive device 12, due to the lights of an oncoming vehicle, this device lowers the signal grid potential and reduces the conduction sufficiently to cause deenergization of relay 30. Then the contacts 36, 38 are broken and relay 40 releases. Relay arm 44, still connected to the positive potential source through contacts 16, 17 of switch 18, now engages contact 50 which is connected to the lower beam filament (or filaments) and this filament therefore is energized.

Once the automatic system has established the lower beam filament, the bias on tube 20 is further increased in order to maintain this condition in case the illumination of the photosensitive device 12 should diminish due to the dimming of the oncoming headlamps or the like. To accomplish this, resistor 54 is connected between the cathode of tube 20 and contact 50. Therefore, when relay arm 44 and contact 50 are closed to supply the positive energizing potential through footswitch 18 to the lower beam filament, resistor 54 is connected to the positive energizing source thereby forming a voltage divider with resistor 22, varistor 25 and resistor 27. This effectively increases the cathode potential to increase the bias of tube 20, further tending to reduce the conduction thereof and maintain relay 30 deenergized. It may also be noted that when there is insufficient illumination of the photosensitive device 12 to cause automatic dimming, that is, when relays 30 and 40 are energized, contact 50 will be open and resistor 54 will be connected to ground through the lower beam filament. This will effectively place resistor 54 in parallel with varistor 25 and resistor 27 to reduce the bias of tube 20, thereby tending to cause increased conduction thereof. The lower beam filament 52 will, of course, remain unlighted since the portion of the tube current conducted therethrough would be insufficient to cause it to light.

The footswitch 18 may be operated to bring switch arm 16 into engagement with contact 60 in order to lock out the automatic system and energize a different beam filament than was previously energized. Assuming that the apparatus is in a comparatively dark area, tube 20 will be conductive and relays 30 and 40 will be energized to energize filament 48 as previously described. However, if switch arm 16 is moved to complete the circuit with contact 60, filament 52 will become energized. As footswitch 18 is operated, the energizing voltage is removed from the tube 20 and relay 30 so this relay releases. However, relay 40 is of the slow-to-release type and before this relay has actually released, the positive potential is applied through contact 60 and the relay arm 64, which is in engagement with contact 66, and through the contact 68 now engaged by the released arm 36 of relay 30 to complete an energization circuit to relay 40, thereby holding this relay energized. Relay arm 64 is also connected to the relay arm 70 which is in engagement with contact 72 which is connected to the lower beam filament 52 so that this filament is now energized. This condition of the system will prevail until footswitch 18 is again operated to its automatic position.

Now assuming that the apparatus is in a comparatively light area so that photodevice 12 has caused reduced conduction of tube 20 and release of relays 30 and 40 to energize the lower beam filament 52 in the automatic operation of the system, changing of the switch 18 to the override position will now cause energization of the upper beam filament 48. This is done directly since the relay arm 70 is connected to contact 60, and in the released condition of relay 40, relay arm 70 engages the contact 75 which is connected to the upper beam filament 48. Since the energizing voltage has been removed from the circuit of tube 20 in relay 30, the override condition to the upper beam filament will prevail until the footswitch has been moved back to the automatic position at which time the illumination of the photodevice 12 will determine the condition of the system.

In a device of practical construction components of the following values were used:

Photo device 12 _____ Clairex CL404D.
Variable resistor 13 _____ 150,000 ohms (each section).
Varistor 15 _____ 1,500 ohms at 10 volts D.C.
Resistor 14 _____ 1000 ohms.

Resistor 19 _____ Matched to photo device 12.
Tube 20 _____ 12K5.
Resistor 22 _____ 39 ohms.
Regulator resistor 25_____ Pilot light manufactured by Tung Sol, No. 1847.
Variable resistor 27 _____ 75 ohms.
Relay 30 _____ 25 mw., 400 ohms.
Pilot light 34 _____ 12 volt.
Relay 40 _____ Power type relay.
Resistor 54 _____ 1000 ohms.

In the circuit of Fig. 2, components which correspond to those of the circuit of Fig. 1 are given the same reference numerals. In this circuit the winding of relay 80 is connected between the anode of tube 20 and the contact 17 of switch 18. When the apparatus is in a comparatively dim area tube 20 is conducting to cause energization of relay 80 so that relay arm 85, which is connected to contact 17, engages contact 87 which is connected to the winding of relay 95 and this relay is energized. The arm 97 of relay 95 therefore engages contact 99 to complete a circuit from the positive potential source to the upper beam filament 48.

When sufficient light strikes the device 12, tube 20 reduces the conduction through relay 80 causing it to release and break the contact of arm 85 with contact 87 so that relay 95 releases. At this time, relay arm 97, which is connected to the positive potential source, engages fixed contact 101 which is connected to the lower beam filament 52 so that this filament is energized.

It may also be noted that the second grid, or signal grid, of tube 20 is connected to a contact strip 110 in the speedometer 115. The pointer 117 of the speedometer carries a contact 118 which is connected to ground. Contact 118 completes the connection through the contact strip 110 at vehicle speeds of 35 miles per hour and below in order to ground the signal grid of tube 20. Therefore, conduction of the tube will be reduced to cause release of relay 80 and release of relay 95 to establish the lower beam filament whenever the vehicle speed is below 35 miles per hour, or any selected speed depending upon the one at which strip 110 engages contact 118. Obviously contact strip 110 may also be coupled to tube 20 in the circuit of Fig. 1 to control that system similarly. This feature may be useful in traveling through towns and other areas where there may be great changes in illumination level due to electric signs and the like which could cause undesirable operation of the control system when the vehicle is moving slowly and the upper beam filament is not required. However, it is also possible to override either the upper or lower beam conditions of the control system as described.

Assuming that relays 80 and 95 are deenergized and that the lower beam filament 52 is energized, movement of switch 18 to the override position with arm 16 in engagement with contact 60 will energize the upper beam filament 48. This operation of switch 18 will complete a circuit from the positive potential source through the relay arm 105, contact 106, and contact 87 which is connected to relay 95. Therefore, relay 95 will become energized to bring arm 97 into engagement with contact 99 and complete a circuit to the positive potential source for filament 48.

If relays 80 and 95 are both energized so that the upper beam filament 48 is energized, the override is as follows. Relay 80 is of the slow-to-release type so that moving switch arm 16 into engagement with contact 60 will complete a circuit from the positive potential source through relay arm 105, contact 110, and resistor 112 to the anode side of relay 80. The other side of relay 80 is connected through the arm 85 and contact 87 and the winding of relay 95 to ground. The winding of relay 80 is of the plate current type which requires but a small amount of current to maintain energization thereof. Relay 95 on the other hand, is of the power type which requires considerably more current to operate the relatively heavy contacts used for the circuits of the filaments. Accordingly, while a circuit is completed through both relays, resistor 112 is chosen to limit the current through this circuit to a value such that relay 80 is maintained energized but yet the current through relay 95 is not sufficient to cause this relay to remain energized. Therefore, when relay 95 releases this completes a circuit through arm 97 and contact 101 for the lower beam filament 52. Relay 80 remains energized through the self-holding circuit as described so that tube 20 is no longer effective in the control thereof, and the established lower beam filament remains energized until switch 18 is moved from the override position to the automatic position at which time the automatic control again becomes effective.

The system of the present invention therefore provides an automatic headlamp control circuit which may be operated directly from the potential of the power system in an automobile. Voltage regulation circuits are used in order to prevent unstable operation due to voltage changes occurring in the electrical system at different outputs of the vehicle generator. Furthermore, the system is comparatively simple and requires but a minimum of component parts, in the sense that no separate power supply apparatus is required and only a single pole double throw override switch in conjunction with two single winding relays permits complete override control of the automatic system.

I claim:
1. A control system for automatically selectively energizing upper and lower beam filaments of a headlight including in combination, a potential supply circuit adapted to be connected to a potential source and including a single pole double throw switch, a first relay having contacts coupled to the upper and lower beam filaments for selectively energizing the same, said first relay when operated energizing the upper beam filaments and when released energizing the lower beam filaments, an electron discharge device, a second relay coupled to said electron discharge device and controlled by the conduction thereof, said second relay having contacts closed in the energized condition thereof and a connection thereto for operating said first relay and thereby energizing the upper beam filaments, said switch having an automatic position providing a connection to said second relay for completion of the current path of said discharge device therethrough, light sensitive means connected to said potential supply circuit and to said electron discharge device to reduce the conduction thereof and release said second relay with a certain illumination level at said light sensitive means, one of said relays being of the slow-to-release type and having movable contact means and fixed contacts engaged thereby in the energized and deenergized conditions of such relay, said switch having an override position providing a connection to said movable contact means of said one relay for energizing the same, a circuit connected to one of said fixed contacts for establishing a connection to energize the upper beam filament with said switch in override position and said one relay deenergized, and a manual control circuit connected to another of said fixed contacts for operating said one relay independently of operation of said light sensitive means, said manual control circuit maintaining said one relay energized and establishing a connection to energize the lower beam filament with said switch in override position, thereby providing manual override of said control system by said switch in either position of said one relay.

2. The control system of claim 1 which includes a bias resistor connected to said electron device and to a contact of said first relay for biasing said electron device according to the energization of one of the beam filaments.

3. The control system of claim 1 which is adapted to be used in a vehicle and which includes a bias circuit energized below a selected speed of the vehicle for biasing said electron discharge device to reduce the conduction thereof and deenergize said second relay to cause energization of the lower beam filament.

4. A control system for upper and lower beam filaments of the headlights in a vehicle, including in combination, a potential supply circuit adapted to be coupled to a potential source, first and second relays having contacts closed in the energized and deenergized conditions thereof, light sensitive means and an electron valve controlled thereby for energizing said first relay and for deenergizing the same with greater than the given illumination level, a switch having first and second positions, a circuit completed in said first position of said switch and coupling said potential supply circuit to said first relay for energizing said electron valve, a circuit completed in said first position of said switch and connected to contacts of said first relay for energizing said second relay upon energization of said first relay, a circuit coupled to said contacts of said second relay for energizing the lower beam filament upon deenergization of said second relay and for energizing the upper beam filament upon energization of said second relay, a circuit connected to said contacts of said first relay and completed in said second position of said switch for energizing said second relay and the upper beam filament and for deenergizing the lower beam filament upon energization of said second relay, said first relay being of the slow-to-release type and requiring less current for energization thereof than said second relay, and a circuit completed in said second position of said switch and including a resistor for energizing said first relay through contacts thereof and through said first relay, said resistor having a value to limit current flow below that necessary for energization of said second relay.

5. In a vehicle having a generator-battery power source providing a potential of the order of 14 volts and headlamps with upper and lower beam filaments, a control system for automatically energizing the upper and lower beam filaments and providing manual override of such automatic control including in combination, a potential supply circuit adapted to be coupled directly to the power source and including a two position manual switch, a first relay having contacts adapted to be coupled to the filaments for selectively energizing the same, a vacuum electron discharge device having a signal grid and a space charge grid, a second relay coupled to said electron discharge device and controlled by the conduction thereof, said second relay having contacts connected to said first relay for controlling energization thereof, said two position manual switch coupling said second relay to said potential supply circuit through said switch in an automatic position thereof to form a current path for said electron discharge device, a connection for energizing said space charge grid from said potential source, light sensitive means connected to said potential supply circuit and to said signal grid to control the conduction of said discharge device and to thereby control said second relay depending upon the illumination level at said light sensitive means, one of said relays being of the slow-to-release type and having movable contact means and first and second fixed contacts engaged thereby respectively in the energized and deenergized conditions of such relay, a circuit coupling said movable contact means to said potential supply circuit through said switch in an override position thereof, a circuit connected to said second fixed contact and energizable through said movable contact means for establishing a connection to energize the upper beam filament, and a manual control circuit connected to said first fixed contact for controlling said one relay independently of said light sensitive means, said manual control circuit maintaining said one relay energized through said switch in the override position thereof and establishing a circuit to energize the lower beam filament, thereby providing manual override of said control system by said switch.

6. The control system of claim 5 wherein said electron discharge device has a cathode and said system including a bias network connected to said cathode and to said signal grid of said discharge device, and resistor means connected between said bias network and a contact of said first relay means for biassing said discharge device according to the energization of the beam filaments.

7. The control system of claim 5 wherein said electron discharge device has a cathode and said system includes a cathode bias network having a voltage regulating device for stabilizing operation of said electron device upon variation in the voltage of the potential sources.

References Cited in the file of this patent

UNITED STATES PATENTS

| | | |
|---|---|---|
| 2,431,394 | Friedman | Nov. 25, 1947 |
| 2,572,144 | Healy | Oct. 23, 1951 |
| 2,685,048 | Schweitzer | July 27, 1954 |
| 2,749,478 | Gaudelot | June 5, 1956 |
| 2,835,847 | Guyton | May 20, 1958 |